May 30, 1933.    L. E. LA BRIE    1,911,452

BRAKE

Filed Aug. 30, 1929

INVENTOR.
Ludger E. La Brie
BY H. O. Clayton
ATTORNEY

Patented May 30, 1933

1,911,452

UNITED STATES PATENT OFFICE

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS

BRAKE

Application filed August 30, 1929. Serial No. 389,556.

This invention relates to brakes and is illustrated as embodied in an internal expanding automobile brake of the full-wrapping type in which the friction means anchors at one end when the drum is turning in one direction and at the other end when the drum is turning in the other direction.

An object of the invention is to improve both the operating and anchoring means of the brake and to facilitate its adjustment.

Preferably the brake includes operating means such as a toggle arranged in a plane parallel with the plane of the brake and which is operable by a flexible tension element connected thereto. The toggle operating means which is preferably arranged at one side of the brake serves to expand the separated ends of an annular friction element, which ends are adapted to anchor respectively through a movable link placed in tension and a stamping such as an angle iron rigidly secured to the brake support. Thus in one direction of drum rotation the braking torque is taken by the tension means and with the reverse direction of rotation the fixed abutment takes the torque.

A further object of the invention resides in the provision of a novel adjustment for the friction element at one end thereof and which adjustment comprises relatively movable juxtaposed plates, the relative position of which is determined by a laterally movable wedge member adapted to abut beveled portions at the ends of slots in the respective plates, the reaction of the wedge member in forcing the plates apart being taken by a cup-shaped washer member abutting one of said plates.

Other objects and features of the invention, including an alarm structure co-operating with the aforementioned washer indicating to the operator the position of the adjusting means; also a novel arrangement of eccentric adjustable stops for determining the idle position of the brake; and various other details of construction and combinations of parts will become apparent from the following description of one illustrative embodiment of the invention shown in the accompanying drawing, in which.

Figure 1:
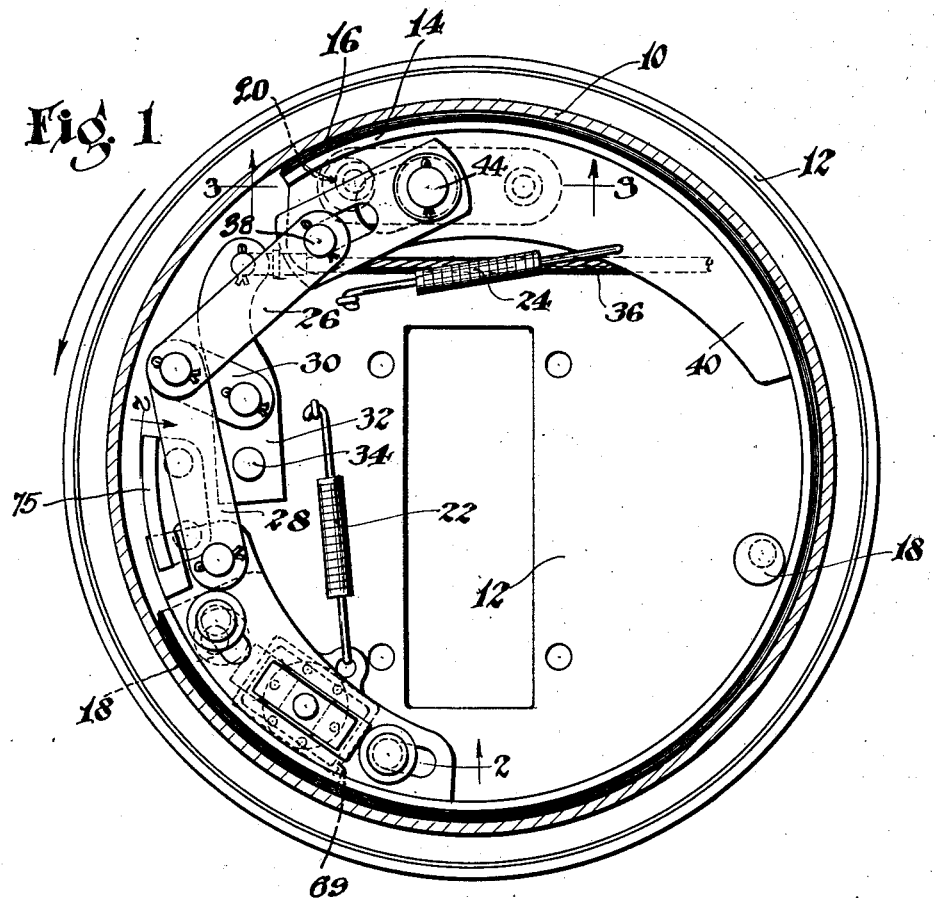
Figure 1 is a vertical section through the brake just inside the head of the brake drum, and showing the brake friction means in side elevation.

In the illustrated and preferred embodiment of the invention, the brake includes a rotatable drum 10 at the open side of which is a support such as a backing plate 12 and within which is arranged the friction means of the brake, preferably comprising a floating device such as an expansible flexible band 14 provided on its rim face in the form shown with friction lining 16 riveted or otherwise secured thereto.

The idle position of the band 14 with the brake released is determined by novel adjustable stops such as disks 18 eccentrically secured to pins 20 secured to the backing plate, the disks contacting the inner face of the band 14 and when rotated serving to force the same outwardly to determine the released position of the band under the action of springs 22 and 24. Three such eccentrics are employed one each at the ends of the band and one positioned substantially diametrically opposite the opening between the ends of the band.

The band 14 is separated to contact the rotating drum by means of a novel toggle preferably arranged at the front of the brake, that is, at one end of a horizontal diametrical line in the left front brake disclosed in Figure 1. The toggle may consist of links 26 and 28, each link comprising parallel stampings pivotally connected at their adjacent knuckle ends and arranged to be actuated by a tension link 30 pivotally secured to the knuckle and at its other end to a vertically extending applying lever 32 fulcrumed to a pin 34 rigidly secured to the backing plate 12, which lever is preferably actuated by a flexible tension element 36 pivotally secured thereto and extending through the plate 12 to be connected to the service pedal or other power source.

Figure 3:
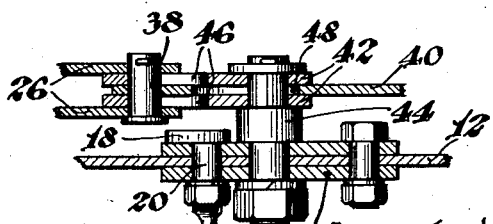
Figure 3 is a partial section, taken on the line 3—3 of Figure 1, showing in detail the anchoring structure for one end of the brake.

The link 26 of the toggle is pivotally connected to a pin 38 (Figure 3) passing through a reinforcing web 40 rigidly secured to one end of the band 14. With the wheel rotating in the direction of the arrow in Figure 1 (that is, with the vehicle moving forward), the torque of the band is taken directly on pin 38 upon which are pivotally mounted parallel anchoring tension links 42 pivotally secured at their ends to an anchor pin 44 rigidly secured to the support plate 12. The anchor links are preferably slotted at 46 to permit movement of the band with its pin in the direction to anchor on its other end and the web of the shoe at 48 is slotted about the anchor pin to permit this reverse movement. This particular type of tension link anchor is more particularly described and claimed in copending applications of Roy S. Sanford No. 388,348 filed August the 26th, 1929, and Humphrey F. Parker No. 381,195 filed July the 26th, 1929. Relative to this structure, it is to be noted that the eccentric adjustment pin 20 is passed through reinforcing plates 50 secured to the backing plate at the anchor pin 44.

Figure 2:
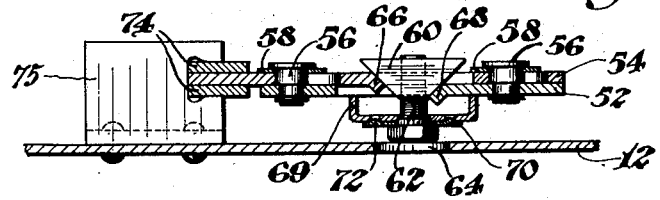
Figure 2 is a partial transverse section, on the line 2—2 of Figure 1, through the novel adjustment of the brake.

According to a very important feature of my invention, the overall length of the band between its connections to the toggle links may be increased by a novel adjustment structure to compensate for the wear of the friction lining, thus preserving the relative angularity of the links of the toggle and their position with respect to the remainder of the actuating mechanism. This particular construction, as more completely disclosed in Figure 2, preferably comprises a relatively short radially extending web member 52 welded or otherwise permanently secured to the inner face of the band 14 at its lower end (Figure 1). A similar plate 54 substantially co-extensive in length with said plate 52 is preferably mounted parallel and in juxtaposition therewith and relatively movable thereto by means of pins 56 fixedly secured to the plate 52 and passing through slots in the plate 54. These pins which are provided with washers 58 slidingly contacting the sides of the plate 54 provide a slightly loose fit to permit the relative sliding movement of the two plates to effect the desired adjustment. This adjustment may be effected by a wedge-shaped member 60 threadedly mounted on the end of a set screw 62, the hex head of the latter positioned opposite an opening 64 in the backing plate to permit rotation of the same from outside the brake. The faces of the wedge preferably abut beveled portions 66 and 68 formed by pressing, toward the backing plate, the body of the plates 52 and 54 at the ends of superposed rectangularly shaped slots therein to accommodate the wedge. A cup-shaped washer member 69 rectangular in peripheral outline may be provided with a circular opening to accommodate the headed end of the set screw 62, one side of the washer adapted to contact with the inner face of the band, as shown in Figure 1, to obviate turning movement of the washer.

In order to indicate to the operator the degree of angular movement of the set screw in effecting the adjustment, there is provided a circular washer member 70 having a polygonal shaped opening adapted to surround a correspondingly shaped shoulder on the set screw, said washer being also provided with tab portions 72, preferably six in number, struck inwardly from the washer to fit within corresponding openings in the cup-shaped washer 69.

The end of the adjusting plate 54 is preferably provided with projection welded plates 74 on either side thereof to increase the bearing surface in contact with an angle iron anchor member 75 rigidly secured to the backing plate and which anchor member is slotted to accommodate the thickened end of the adjusting plate.

In operation, actuation of the flexible tension element by the operator serves to apply the second class lever 32 to flatten the toggle, spreading the ends of the shoe apart into drum engagement. The selective anchoring of the band 14 upon either the tension link or the angle iron abutment then takes place depending upon the direction of drum rotation and upon release of the power actuated mechanism the return springs within the brake serve to withdraw the band from the drum into contact with the aforementioned adjustable stops. With continued service of the brake and its consequent lining wear, it becomes necessary to increase the overall length of the band which is readily effected by the manual adjustment of the set screw 62 to relatively move the plates 52 and 54. The positioning of the toggle parts in the plane of the brake permits of relatively long links forming the same, which reduces to a minimum the flattening of the toggle to effect the brake application. This is particularly desired, inasmuch as the pressure applied at the ends of the toggle links is a first derivative of the angularity of the links during the spread of the same.

While one illustrative embodiment of my invention has been described in detail, it is not my intention to limit the scope of the invention to that particular embodiment or otherwise than by the terms of the appended claims.

My divisional application #625,137, filed July 27, 1932, is directed to the subject matter relative to the applying means shown and described herein.

I claim:

1. Adjusting means for an annular band brake member comprising, in combination, a relatively short web member rigidly secured to one end of the band and provided intermediate its ends with a slot having at one end thereof a beveled portion struck out from the web of the plate, a second plate member arranged in abutment with and parallel to said first-mentioned plate and provided with a correspondingly shaped and positioned slot also having at one end thereof an outwardly struck beveled portion, said beveled portions together defining a support for a laterally movable wedge member.

2. A brake including a friction element having rigidly secured at one end thereof a radially extending web plate, a second plate member in sliding abutment with the first plate, both plates provided with registering slots and each slot provided at one end thereof with a beveled portion, together with a laterally movable wedge member positioned within the slots and adapted to ride on the beveled portions and means for urging said wedge laterally comprising a bolt having mounted thereon a cup-shaped washer member contacting one of said plates.

3. A brake including a friction element having rigidly secured at one end thereof a radially extending web plate, a second plate member in sliding abutment with the first plate, both plates provided with registering rectangularly shaped slots and each slot provided at one end thereof with a beveled portion, together with a laterally movable wedge member positioned within the slots and adapted to ride on the beveled portions and means for urging said wedge laterally comprising a bolt having mounted thereon a cup-shaped washer member contacting one of said plates.

4. A brake including a friction element having rigidly secured at one end thereof a radially extending web plate, a second plate member in sliding abutment with the first plate, both plates provided with registering slots and each slot provided at one end thereof with a beveled portion, together with a laterally movable wedge member positioned within the slots and adapted to ride on the beveled portions and means for urging said wedge laterally comprising a bolt having mounted thereon a cup-shaped washer member contacting one of said plates and means supported by said bolt for indicating the degree of angular movement of said bolt.

5. In an adjusting means for a brake friction element, a rotatable bolt, a washer member stationary with respect to said bolt and mounted thereon and engaging the side of the friction member, together with means for determining the degree of relative movement of said parts comprising a member mounted to rotate with said bolt and provided with parts registering with openings in the washer to determine its position relative thereto.

6. In an adjusting means for a brake friction element, a rotatable bolt, a cup-shaped washer member rectangular in peripheral outline, said member being stationary with respect to said bolt and mounted thereon, together with means for determining the degree of relative movement of said parts comprising a disk member mounted to rotate with said bolt and provided with parts registering with openings in the washer to determine its position relative thereto.

7. A brake comprising a friction element having a slotted web, a member movable on the web having a slot registering with the slot in the web and a wedging member movable transversely in the slot.

8. A brake comprising a friction element having a web provided with a slot, a member movably mounted on the web having a slot registering with the slot in the web, a member movable transversely in the slots, and means associated therewith for determining the relative movement of the web and the member movable thereon.

9. A brake comprising two parts having overlapping portions provided with registering slots, a member movable transversely in the slots, a member bridging the slots, a member supported by the bridge threaded into the transversely movable member, and means associated therewith for determining the relative movement between the parts.

10. A brake comprising two parts having overlapping portions provided with registering slots, oppositely arranged bearing surfaces of the respective parts, a member movable transversely in the slots engaging the bearing surfaces, a member bridging the slots having a plurality of recesses, a member supported by the bridge threaded into the transversely movable member, and a disc carried on the member supported by the bridge having a plurality of bosses adaptable for engagement with the recesses in the bridge.

In testimony whereof, I have hereunto signed my name.

LUDGER E. LA BRIE.